United States Patent [19]

Komurasaki et al.

[11] Patent Number: 4,739,245
[45] Date of Patent: Apr. 19, 1988

[54] OVERVOLTAGE ALARM CIRCUIT FOR VEHICLE GENERATOR WITH FALSE ACTUATOR PREVENTION

[75] Inventors: Keiichi Komurasaki; Shiro Iwatani, both of Himeji, Japan

[73] Assignee: Mitsubishi Denki Kabushiki Kaisha, Tokyo, Japan

[21] Appl. No.: 929,314

[22] Filed: Nov. 12, 1986

[30] Foreign Application Priority Data

Nov. 18, 1985 [JP] Japan ............................ 60-177797[U]

[51] Int. Cl.⁴ ............................................... H02J 7/14
[52] U.S. Cl. .......................................... 322/99; 320/64
[58] Field of Search ....................... 322/28, 29, 32, 99; 320/64

[56] References Cited

U.S. PATENT DOCUMENTS 4,525,662  6/1985  Kato et al. ............................ 322/28
4,590,414  5/1986  Mayumi et al. ....................... 320/64
4,618,811  10/1986  Mashino et al. ..................... 322/28

Primary Examiner—R. J. Hickey
Attorney, Agent, or Firm—Sughrue, Mion, Zinn, Macpeak and Seas

[57] ABSTRACT

A control device for a vehicle mounted generator 1 includes a rectifier 2, a voltage regulator 3 and an overvoltage alarm circuit 4 which includes an overvoltage detection level modifying circuit which renders the alarm circuit insensitive to a temporary overvoltage due to the disconnection of a relatively heavy electrical load 6 of the vehicle from the battery 5. The detection level modifying circuit functions to change the junction potential of a voltage divider supplying a comparator input.

5 Claims, 3 Drawing Sheets

OVERVOLTAGE ALARM CIRCUIT FOR VEHICLE GENERATOR WITH FALSE ACTUATOR PREVENTION

BACKGROUND OF THE INVENTION

The present invention relates to a control device for a vehicle mounted generator and, particularly, to such device by which an undesired energization of an alarm lamp due to a disconnection of an electrical load of the vehicle from the generator is prevented so long as the generator system is operating normally.

FIG. 1 is a circuit diagram of a prior art control device for a vehicle mounted generator, in which a generator 1 which is driven by an engine (not shown) of the vehicle includes an armature winding 101 and a field winding 102. A fullwave rectifier 2 having output terminals 201, 202 and 203 is connected to the generator 1 to rectify the a.c. output voltage thereof. The main output of the generator 1 is derived from terminal 201 amd output terminal 202 is connected to field winding 102, a voltage regulator 3 and an alarm circuit 4 to supply an output voltage to them. Terminal 203 is grounded.

The voltage regulator 3 serves to regulate the output voltage of the generator 1 to a predetermined value and includes a voltage divider composed of a series connection of resistors 301 and 302 connected between the output terminal 202 and ground. The junction between the series connected resistors 301 and 302 is connected through a Zener diode 303 to the base of an input transistor 304 of the voltage regulator 3. The Zener diode 303 serves to detect the output voltage of the generator 1.

The emitter of the input transistor 304 is grounded and the collector thereof is connected to the base of an output transistor 305 to the voltage regulator 3. The base of transistor 305 is connected through a base resistor 306 to output terminal 202. The emitter and collector of transistor 305 are grounded and connected through a diode 307 and the field winding 102 to output terminal 202, respectively. That is, diode 307 which serves to absorb surges of the field winding 102 is connected in parallel to the field winding 102. Transistor 304 is on-off controlled by the Zener diode 303 and transistor 305 is on-off controlled by transistor 304 to on-off control the current of the field winding 102.

The alarm circuit 4 is provided to monitor the output voltage of the generator 1 and includes a voltage divider composed of series connected resistors 409 and 410 connected between output terminal 202 and ground. The junction between the resistors 409 and 410 is connected to an inverted input of a comparator 406.

A non-inverted input of the comparator 406 is connected to the junction between series connected resistors 407 and 408 constituting a voltage divider connected between a constant voltage source A, which is established when a key switch 7 is closed to start the engine, and ground, to provide a reference voltage to the non-inverted input.

The output of the comparator 406 is connected through a Zener diode 404 to a base of a transistor 405 and through a resistor 403 to the output terminal 202. The comparator 406 is enabled upon the closure of the key switch 7.

Transistor 405 is turned on when the Zener diode 404 is turned on, and has a grounded emitter and a collector connected to the base of an output transistor 401 and through a resistor 402 to a point $P_1$ between the key switch 7 and a reverse current blocking diode 8. The output transistor 401 has a grounded emitter and a collector connected through an alarm lamp 10 to the point $P_1$ which is connected through diode 8 and a resistor 9 for the initial energization of the field winding 102 to the output terminal 202.

Point $P_1$ is grounded through the key switch 7 and a battery 5 which is mounted on the vehicle. Electrical loads which are depicted as a single load 5 are connected in parallel to the battery, whose positive terminal is connected to the output terminal 201.

In operation, when the key switch 7 is closed to start the engine, an initial energizing current flows from the batttery 5 through the key switch 7, the reverse current blocking diode 8 and the resistor 9 to the field winding 102, and thus the generator 1 becomes ready to generate.

The potential at the output terminal 202 of the rectifier 2 under such condition is a fraction of the battery voltage determined by the internal resistance of the field winding 102, and is relatively low.

On the other hand, the alarm circuit 4 is supplied at the base of the transistor 401 with the battery voltage through the key switch 7 and the resistor 402 to turn the latter transistor on to thereby light the alarm lamp 10.

When the engine starts and the generator 1 starts to generate an output voltage, the latter is applied through the resistor 403 to a cathode of the Zener diode 401. When the output voltage increases, the Zener diode 404 is turned on to turn transistor 405 on and transistor 401 off, to thereby extinguish the alarm lamp 10, indicating a commencement of an ordinary power generation of the generator 1.

On the other hand, the voltage regulator 3 detects the output voltage by the resistors 301 and 302 and the Zener diode 303 and, when the output voltage exceeds a value preset by these elements, the Zener diode 303 is turned on and transistor 304 is also turned on. When the output voltage is reduced below the preset value, the Zener diode 303 and hence transistor 304 are turned off.

Transistor 305 is on-off controlled by transistor 304 to on-off control the field current of the winding 102, to thereby regulate the output voltage to the preset value in a well known manner.

If the voltage regulator 3 is out of operation for some reason, the output voltage of the generator may increase abnormally. Under such an abnormal condition, the abnormal output voltage is detected by resistors 409 and 410 and the comparator 406 of the alarm circuit 4 and, when the detected voltage is higher than the reference voltage of the comparator 406, the output of the latter drops to an "L" level upon which Zener diode 404 and transistor 405 are turned off and transistor 401 is turned on to light the lamp 10.

That is, the alarm circuit 4 functions to indicate the out-of-control condition of the voltage regulator 3, i.e., an overvoltage at the output of the generator 1.

The reference voltage of the alarm circuit 4 is usually set higher by about 2 volts than the preset voltage of the voltage regulator 3.

On the other hand, when the electrical load 6 which is relatively large is connected to the battery when the generator system is operating normally, the output current of the generator 1 increases correspondingly to the load and a large field current is thus necessary to provide such a large output current flowing through terminal 201. When the load 6 is disconnected from the battery under such condition, the output voltage of the generator 1 is increased. When the increased output voltage exceeds the preset value of the voltage regulator 3, transistor 305 is turned off and thus the field current is cut off. However, since the field winding 102 is inductive, a large amount of inductive energy is produced. Further, since the field winding 102, together with the diode 307, forms a closed circuit, such inductive energy is consumed by the internal resistance of the field winding 102. The inductive current has a peak value before the cut-off time of the field current, and is attenuated at a rate determined by a LR time constant of the resistance and the inductance of the field winding 102.

That is, since current continues to flow through the field winding 102 for a short time after the current supply controlled by the voltage regulator 3 is cut off, the output voltage of the generator is further increased in this short time.

The higher the increasing rate of the output voltage the larger the field current, i.e., the larger the output current, before the field winding 102 is cut off by the voltage regulator, and the higher the rotational speed of the generator 1.

Thus, when a load 6 which is relatively large is disconnected from the battery, the output voltage of the generator 1 increases above the preset value of the voltage regulator 3 and, when the output voltage reaches the overvoltage detection level of the alarm circuit 4, the lamp 10 is lit momentarily which may give the operator of the vehicle a sense of uneasiness.

SUMMARY OF THE INVENTION

The invention was made in view of the above mentioned problems inherent to the conventional control device and is featured by having means provided in the alarm circuit, which is capable of modifying the overvoltage detection level according to the condition of the output transistor of the voltage regulator.

In the present invention, the overvoltage detecting portion of the alarm circuit functions to detect the condition of the output transistor of the voltage regulator, i.e., detect the potential at a junction between the field winding and the output transistor to modify the overvoltage detection level.

DETAILED DESCRIPTION OF THE PREFERRED EMBODIMENTS

Figure 1:
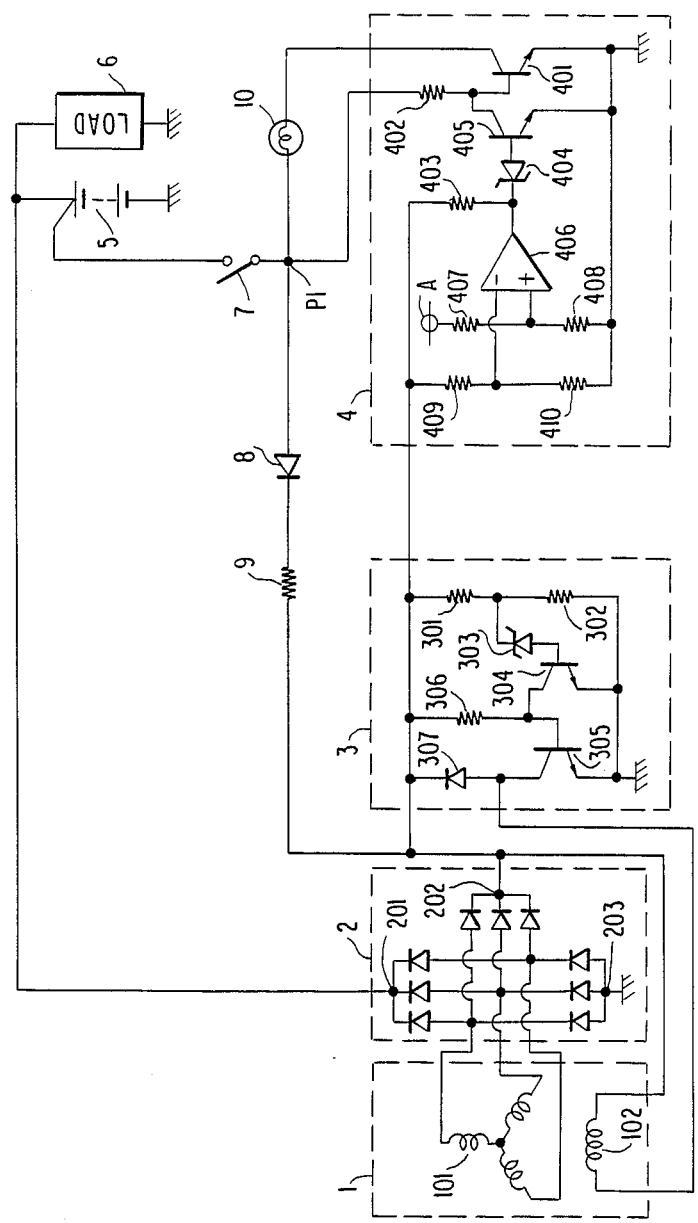
FIG. 1 is a circuit diagram of a conventional control device for a vehicle mounted generator.
Figure 2:
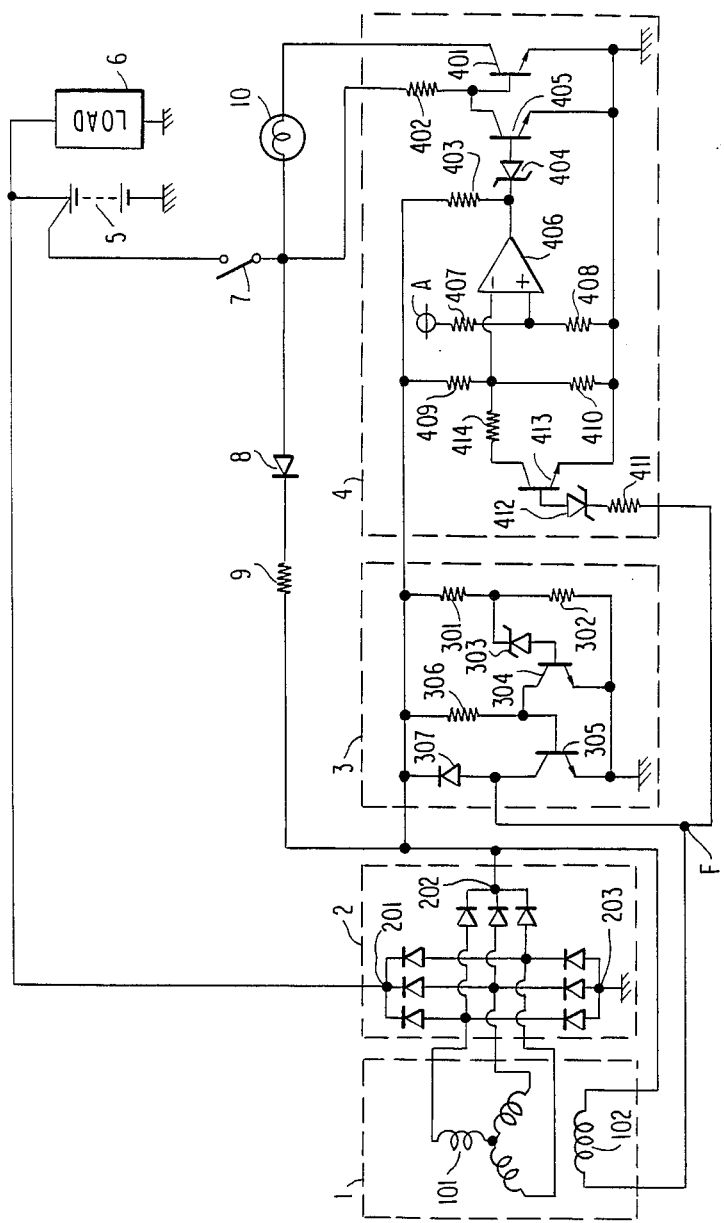
FIG. 2 is a circuit diagram of an embodiment of the invention.

FIG. 2 shows a circuit diagram of a control device according to the invention which has a similar construction to that of the conventional control device shown in FIG. 1 and operates in substantially the same manner, except for some portions. Since elements of the circuit in FIG. 2 common to the circuit in FIG. 1 are depicted by the same reference numerals, only the new portions will be described in detail.

In FIG. 2, the alarm circuit 4 additionally includes an overvoltage detecting portion composed of a resistor 411, a Zener diode 412, a transistor 413 and a resistor 414.

One end of resistor 411 is connected to the junction F between the field winding 102 of the generator 1 and the collector of the output transistor 305 of the voltage regulator 3, and the other end is connected through the Zener diode 412 to the base of transistor 413.

The latter transistor has a grounded emitter and a collector connected through resistor 414 to the junction between resistors 409 and 410.

The resistor 411 functions as a base resistor for transistor 413 and has a resistance value which is large enough to make the internal resistance of the field winding 102 negligible.

The Zener diode 412 is turned on when the potential at junction F increases above a certain constant level and, in this embodiment, such level is set around the predetermined level of the voltage regulator 3.

Transistor 413 is controlled by the Zener diode 412 such that, when the latter is turned on, it is also turned on. Resistor 414 is grounded when transistor 413 is turned on, which lowers the voltage at the junction between resistors 409 and 410.

In operation, when the voltage regulator 3 becomes inoperative and the output transistor 305 continues to conduct, causing the potential at junction F to be lowered, or when junction F is grounded by, for example, an undesired metal piece occasionally connecting the junction to ground, the field current may flow continuously to increase the output voltage of the generator 1 uncontrollably. In such case, since the potential at junction F is low, the Zener diode 412 and hence transistor 413 are turned off and resistor 414 does not affect the junction voltage between resistors 409 and 410. When the output voltage of the generator 1 reaches a predetermined overvoltage detection level, the alarm lamp 10 is lit to indicate an uncontrolled overvoltage.

On the other hand, when a relatively large electrical load 6 is disconnected from the battery when the voltage regulator 3 is operating normally, the output voltage of generator 1 increases and output transistor 305 of the voltage regulator 3 is turned off, to thereby increase the potential at juncton F up to the level of the output voltage of the generator 1.

When the potential at junction F exceeds a predetermined value set by the Zener diode 412 of the alarm circuit 4, the latter diode and transistor 413 are turned on, so that the junction voltage between resistors 409 and 410 is reduced by the presence of resistor 414. The overvoltage detection level is thus increased to a value higher than the predetermined regulation level of the voltage regulator 3 by about 4 to 5 volts.

The alarm lamp is thus not lit when the electrical load of the vehicle is disconnected from the battery when the control device and generator are operating normally.

Figure 3:
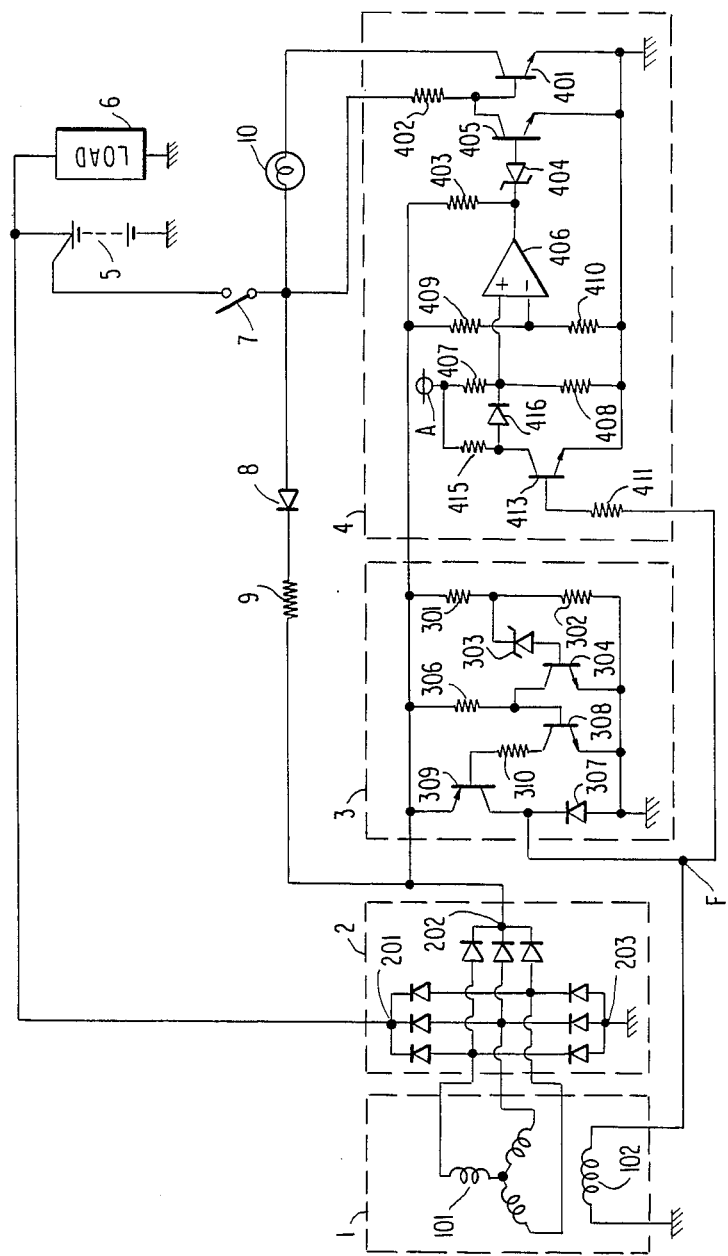
FIG. 3 is a circuit diagram of another embodiment of the invention.

FIG. 3 shows another embodiment of the invention in which the negative terminal of the field winding 102 is grounded, as opposed to the embodiment of FIG. 2 in which the positive terminal thereof is periodically grounded.

In FIG. 3, the output transistor 305 is replaced by an output circuit composed of a transistor 308 having a base connected to the collector of the input transistor 304 of the voltage regulator 3, a transistor 309 having a base connected through a resistor 310 to the collector of transistor 308 and a collector grounded through diode 307. Since transistor 308 is on-off controlled by transistor 304, transistor 309 is turned on when transistor 308 is turned on, and vice versa.

The alarm circuit 4 comprises, additionally, a resistor 415 connected between the constant voltage source A and the collector of transistor 413, which is connected through a reverse current blocking diode 416 to the junction point between resistors 407 and 408 and to the non-inverted input of the comparator 406. Resistor 415 is grounded when transistor 413 is turned on, and is connected in parallel with resistor 407 through diode 416 when transistor 413 is turned off to increase the potential at the junction between the resistors, i.e., the reference potential of the comparator 406 is increased.

In operation, when the voltage regulator 3 becomes inoperative and transistor 309 continues to conduct, or if junction F is short-circuited to the positive terminal of the generator, the field current flows continuously to thereby increase the output voltage of the generator 1. Therefore, the potential at junction F is increased to turn transistor 413 on and ground resistor 415. Thus, the reference voltage of the comparator 406 is unchanged.

When the output voltage of the generator 1 reaches a level equal to or higher than the overvoltage detection level of the alarm circuit 4 under this condition, the alarm lamp 10 is lit.

On the other hand, when a relatively large electrical load 6 of the vehicle is disconnected with the voltage regulator 3 operating normally, output transistor 309 of the voltage regulator 3 is turned off and the potential at junction F becomes zero due to the field winding 102 being grounded.

When the potential at junction F becomes zero, transistor 413 of the alarm circuit 4 is turned off and the reference voltage of the comparator 416, i.e., the overvoltage detection level, is increased by resistor 415 to thereby maintain the alarm lamp 10 off.

As mentioned hereinbefore, according to the invention the overvoltage detection level is modified depending upon the condition of the output transistor circuit of the voltage regulator. Thus, the momentary lighting of the alarm lamp when the electrical load of the vehicle is disconnected is prevented, and the control device of the invention can thus provide an alarm indication of the occurrence of a true overvoltage while such momentary lighting of the alarm lamp is prevented, eliminating the undesired effect for the operator of the vehicle.

What is claimed is:

1. A control device for a vehicle mounted generator (1) comprising: a fullwave rectifier (2) connected to said generator for rectifying an a.c. output voltage of said generator, a voltage regulator (3) having an input transistor circuit (304), an output transistor circuit (305; 309), and regulation level setting means (301, 302, 303) for regulating the output voltage of said rectifier, an overvoltage alarm circuit (4) including a comparator (406) having a reference input supplied with a predetermined reference voltage and a detection input supplied with a detection voltage corresponding to a fraction of said output voltage of said rectifier, an output of said alarm circuit actuating an alarm device (10) in response to the detection of an overvoltage condition characterized by said detection voltage exceeding said predetermined reference voltage, and means (412, 413, 414; 413, 415, 416) for modifying one of said reference voltage and said detection voltage of said comparator according to an operating condition of said output transistor circuit of said voltage regulator to prevent the actuation of the alarm device upon the disconnection of an electrical load from a battery of the vehicle.

2. The control device as claimed in claim 1, wherein said means for modifying comprises a further transistor circuit responsive to a voltage at one terminal of a field winding (102) of said generator connected to said output transistor circuit of said voltage regulator to reduce said fraction to thereby modify said detection voltage of said comparator.

3. The control device as claimed in claim 2, wherein said further transistor circuit comprises a transistor (413) having a base connected through a Zener diode (412) and a resistor (411) to said one terminal of said field winding and a collector-emitter circuit including a resistor (414), said transistor being turned on when a potential at said one terminal of said field winding exceeds a Zener voltage of said Zener diode to connect said resistor to said detection input of said comparator to thereby lower said fraction.

4. The control device as claimed in claim 1, wherein said means for modifying comprises a further transistor circuit responsive to a voltage at one terminal of a field winding (102) of said generator connected to said output transistor circuit of said voltage regulator to increase said predetermined reference voltage of said comparator.

5. The control device as claimed in claim 4, wherein said further transistor circuit comprises a transistor (413) having a base connected through a resistor (411) to said one terminal of said field winding and a collector-emitter circuit adapted to be connected to said reference input of said comparator to modify said predetermined reference voltage of said comparator.

* * * * *